US00RE45178E

(19) United States
(12) Reissued Patent
Olson et al.

(10) Patent Number: US RE45,178 E
(45) Date of Reissued Patent: Oct. 7, 2014

(54) SPINDLE MIXER WITH INTERLOCK ASSEMBLY

(75) Inventors: Larry R. Olson, Montpelier, VA (US); Benjamin H. Branson, III, Mechanicsville, VA (US); Atle Larsen, Henrico, VA (US)

(73) Assignee: Hamilton Beach Brands, Inc., Glen Allen, VA (US)

(21) Appl. No.: 13/517,716

(22) Filed: Jun. 14, 2012

Related U.S. Patent Documents

Reissue of:
(64) Patent No.: 7,780,338
Issued: Aug. 24, 2010
Appl. No.: 11/553,030
Filed: Oct. 26, 2006

(51) Int. Cl.
*B01F 13/04* (2006.01)

(52) U.S. Cl.
USPC ..... 366/206; 366/198

(58) Field of Classification Search
USPC ..... 366/197, 198, 200, 206, 281–284, 601
See application file for complete search history.

(56) References Cited

U.S. PATENT DOCUMENTS

| | | | | | |
|---|---|---|---|---|---|
| 1,465,629 | A | * | 8/1923 | Gilchrist | 366/197 |
| 1,579,590 | A | * | 4/1926 | Beach | 366/206 |
| 1,697,515 | A | * | 1/1929 | Ruetz | 366/206 |
| 1,729,966 | A | * | 10/1929 | Robinson et al. | 366/206 |
| 1,743,105 | A | * | 1/1930 | Blish et al. | 366/206 |
| 1,754,560 | A | * | 4/1930 | Karlson | 366/206 |
| 1,762,376 | A | * | 6/1930 | Andersen | 366/206 |
| 1,764,337 | A | * | 6/1930 | Nielsen | 200/550 |
| 1,764,338 | A | * | 6/1930 | Nielsen | 366/206 |
| 1,843,315 | A | * | 2/1932 | Blish et al. | 366/206 |
| 1,946,840 | A | * | 2/1934 | Cox | 366/146 |
| 2,134,261 | A | * | 10/1938 | Oswell | 366/197 |
| 2,300,542 | A | * | 11/1942 | Forse | 366/203 |
| 2,498,570 | A | * | 2/1950 | Myers | 366/206 |
| 2,585,822 | A | * | 2/1952 | Myers | 366/206 |
| 2,654,847 | A | * | 10/1953 | Arthur | 310/68 B |
| 2,774,579 | A | * | 12/1956 | Brown et al. | 366/198 |
| 2,798,979 | A | * | 7/1957 | Arthur | 310/90 |
| 2,829,872 | A | * | 4/1958 | MacDougall | 366/198 |
| 3,292,912 | A | * | 12/1966 | Stubler | 366/197 |
| 3,379,416 | A | * | 4/1968 | Smader et al. | 366/206 |
| 4,339,639 | A | * | 7/1982 | Valbona et al. | 200/52 R |
| 4,351,612 | A | * | 9/1982 | Valbona et al. | 366/206 |
| 4,518,263 | A | * | 5/1985 | Brym et al. | 366/206 |
| 4,681,030 | A | * | 7/1987 | Herbert | 99/484 |
| 4,822,175 | A | * | 4/1989 | Barnard et al. | 366/347 |
| 5,112,135 | A | * | 5/1992 | Rupp | 366/197 |

(Continued)

OTHER PUBLICATIONS

Updated Photograph of Artemis Model No. A-2001/A Drink Mixer.*

(Continued)

*Primary Examiner* — Timothy Cleveland
(74) *Attorney, Agent, or Firm* — Alexander D. Raring

(57) ABSTRACT

The invention relates to an interlock assembly for a spindle mixer where the interlock assembly includes a cup guide, an actuator pin, and an interlock mechanism. Placing a cup within the cup guide actuates the actuator pin that, in turn, engages the interlock mechanism. Engagement of the interlock mechanism selectively activates an electric motor. The pin moves through the [body of] the guide. The guide can be selectively removed from the mixer, and the pin, in one embodiment, is selectively removed from the guide. An optional bypass switch can be included to allow for the direct engagement of the motor.

15 Claims, 5 Drawing Sheets

(56) References Cited

U.S. PATENT DOCUMENTS

| | | | | |
|---|---|---|---|---|
| 5,547,278 | A * | 8/1996 | Xie | 366/206 |
| 5,730,525 | A * | 3/1998 | Browne | 366/197 |
| 5,912,039 | A * | 6/1999 | Browne | 426/565 |
| 6,126,983 | A * | 10/2000 | Miller | 426/565 |
| 6,439,760 | B1 * | 8/2002 | Langeloh et al. | 366/206 |
| 6,585,404 | B2 * | 7/2003 | Barton et al. | 366/142 |
| 6,634,782 | B2 * | 10/2003 | Barton et al. | 366/142 |

OTHER PUBLICATIONS

Instruction and Maintenance Manual; Santos Drink Mixer No. 54; pp. 1-16.*

* cited by examiner

SPINDLE MIXER WITH INTERLOCK ASSEMBLY

Matter enclosed in heavy brackets [ ] appears in the original patent but forms no part of this reissue specification; matter printed in italics indicates the additions made by reissue.

FIELD OF THE INVENTION

The present invention relates to a mixer with an interlock assembly that includes a cup guide, a cup-actuated actuator pin, and an interlock mechanism. The interlock assembly permits cup-actuated engagement of a mixer motor. An optional pulse switch or momentary switch would bypass the interlock assembly to permit operation of the spindle mixer.

BACKGROUND

Spindle mixers have been known and sold for many years. The typical and traditional spindle mixer includes an electric motor mounted in a housing. The motor housing includes a stand that elevates the motor housing over a surface or mixer base. An elongated spindle or shaft is mechanically attached to the motor and extends downwardly from the motor through the motor housing. The electric motor is then operable to rotate the spindle/shaft in order to mix the contents in a cup or receptacle placed around the spindle. Cup guides on the spindle mixer can be provided to support the cup.

Spindle mixers have included cup-actuated switches to engage the motor. In the most common configuration, inserting the cup into the cup guide causes the rim of the cup to slide the switch, which is independent of the cup guide, along a slot in the face of the stand. Basically, the switch consists of an arm that passes through this slot to actuate an interlock mechanism inside the mixer. Actuating the switch selectively engages the mixer motor. In another embodiment, the entire cup guide moves when the cup is placed on the mixer.

Problems exist with the known spindle mixer constructions and interlock assemblies. For instance the slot exposes the integral portion of the mixer housing, and it is commonly known that the slot or aperture in the mixer can become contaminated with foodstuff (i.e., food or beverage). The opening is often located proximate to the rim of the cup so that when some of the foodstuff is ejected from the cup due to the operation of the mixer, it lands on, around, or in the slot/aperture. Also, the shaft may still be spinning as the cup is removed from the spindle resulting in splattering. As the actuator switch openings are commonly exposed, the switch mechanism can become contaminated with foodstuff. Once contaminated, it can be difficult to properly clean within the mixer, and bacteria growth can become problematic.

The contamination on or within the switch assembly may also impede operation of the switch. The contamination might prevent any necessary electrical connection. Also, where the movement of the cup guide itself acts as an actuator switch, it is possible for a portion of the cup guide to become encrusted with foodstuff from the cup. This type of contamination will cause the switch to "stick" (i.e., movement of the cup guide will be impeded). Obviously, if a portion of the moveable cup guide enters the mixer housing, the foodstuff on the cup guide can be transferred to the interior of the mixer housing. The internal contamination cannot be rectified without disassembling the mixer.

It is also known for the food or drink product in the cup to collect on the mixer around the cup guide. A fixed cup guide can be difficult to properly clean and sanitize. In addition, known cup guides are commonly dimensioned so that an operator can accidentally engage the actuator switch with their finger. This can be an undesirable or unsafe characteristic.

Therefore, there exists a need for an improved interlock assembly for a spindle mixer. Ideally, the exposed portion of the interlock assembly would be selectively removable from the mixer housing. The assembly would reduce or eliminate the possibility of a drink or food product from entering the mixer and would reduce or remove the risk of accidentally engaging the motor via the actuator switch. A spindle mixer with an actuator pin in accordance with the present invention will solve one or more of these or other needs.

SUMMARY OF THE INVENTION

In accordance with the present invention, a spindle mixer with an interlock assembly is provided. The interlock assembly includes a cup guide and an actuator pin wherein the actuator pin interacts with an interlock mechanism inside the mixer. The interlock mechanism translates the motion of the actuator pin in order to selectively engage an electric motor. In one preferred embodiment, the cup guide is selectively attached to the spindle mixer. In another preferred embodiment, a pulse switch or momentary switch may also be included to manually operate the spindle mixer and to bypass the actuator pin and interlock mechanism.

Broadly, the mixer includes a mixer housing comprising a base, a stand extending upwardly from the base, and a motor housing supported by the stand above the base. The motor housing contains an electric motor. A rotatable shaft, which is mechanically connected to the electric motor, extends downwardly from the motor housing toward a support surface upon which the stand rests. The shaft, through engagement of the electric motor, is operable to mix the contents of a cup/receptacle.

The interlock assembly of the present invention includes a cup guide that selectively retains the rim of the cup. The act of inserting the rim of the cup into the cup guide actuates an actuator pin. The pin moves vertically into the mixer housing through the body of the cup guide. The movement of the pin is translated through an interlock mechanism to selectively actuate a power switch. The cup guide and a lower cup rest support the cup so that the shaft extends down into the cup.

In one preferred embodiment, the cup guide includes first and second lips that are substantially parallel to, and spaced apart, from each other. The rim of the cup fits between the front and rear lips, but it is intended that most adult human fingers would not fit between the lips. In another preferred embodiment, a window in the rear of the guide allows access to the pin when the pin is inserted into the guide. The window also allows for better cleaning of the cup guide. The pin is selectively retained in the guide.

In accordance with an embodiment of the present invention, the body of the interlock assembly may also include at least one shaft extending therefrom. The shaft is insertable through apertures in the mixer housing and is selectively retained by a receiver within the mixer housing. The receiver selectively retains the shaft via a conventional mechanism in order to hold the guide in place.

In use, an operator merely inserts the cup rim into the cup guide. The mixer motor is engaged. An optional bypass switch would allow the user to engage the motor without actuating the actuator pin. The operator can also remove the cup guide by simply pulling the guide away from the mixer housing.

An interlock assembly in accordance with the present invention efficiency addresses at least one of the shortcomings associated with the prior art. For example, the structure of the cup guide of the present invention reduces or prevents the possibility of a foodstuff entering the body of the spindle mixer. Moreover, it is easily separated from the mixer housing for the purposes of cleaning the cup guide. The construction of the cup guide and actuator pin will also prevent or reduce occurrences of accidentally engaging the motor. The pin can be selectively removed from the guide. The foregoing and additional features and advantages of the present invention will become apparent to those of skill in the art from the following detailed description of a preferred embodiment taken in conjunction with the accompanying drawings.

DETAILED DESCRIPTION

Figure 1:
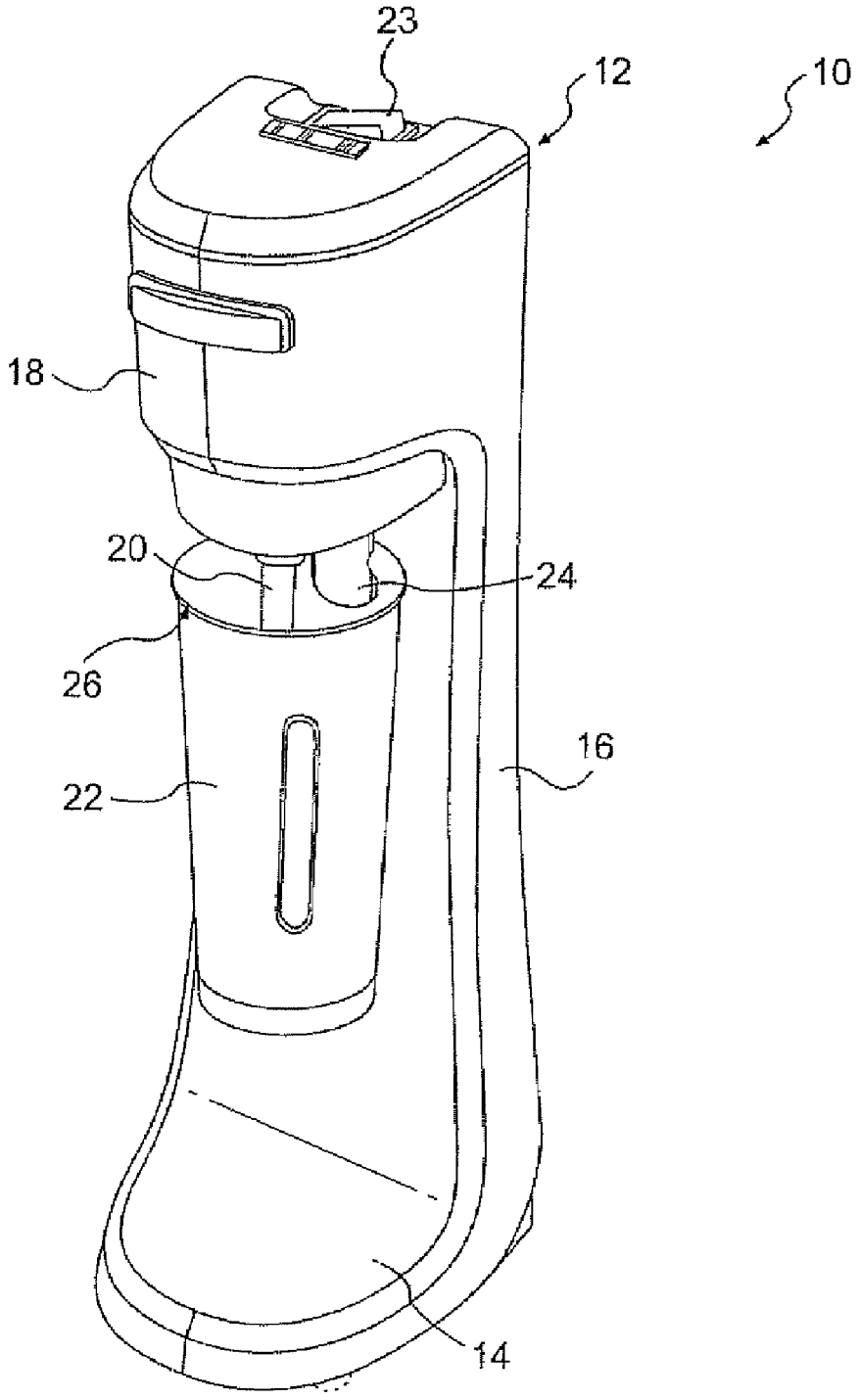
FIG. 1 is a perspective view of a spindle mixer and cup including a cup guide in accordance with the present invention.

An interlock assembly for use with a spindle mixer in accordance with the present invention provides an improved method and apparatus for mixing the contents of a cup in a safe and sanitary manner. As with traditional mixers, and with reference to FIG. 1, a mixer 10 has a mixer housing 12 that includes a base 14, a stand 16 extending upwardly from base 14, and a motor housing 18 supported by stand 16 above base 14. Motor housing 18 contains at least one electric motor (not illustrated). A rotatable shaft 20 is mechanically connected to each electric motor, and shaft 20 extends downwardly from motor housing 18 toward a support surface upon which mixer 10 rests. Shaft 20, through engagement of the electric motor, is operable to mix the contents of a cup/receptacle 22. Various features may be included, such as a speed selector switch 23 or other electronic controls.

In accordance with the present invention, mixer 10 includes an interlock assembly. The assembly is made of 1) a cup guide 24, 2) an actuator pin, and 3) an interlock mechanism that interacts with the actuator pin. Cup guide 24 is dimensioned to accept the rim of a cup, such as rim 26 of cup 22. As better illustrated in FIG. 2, cup guide 24 sits flush against mixer housing 12 in order to reduce or prevent the contamination of the mixer's internals with foodstuffs found in cup 22. In one preferred embodiment, and as will be explained further below, cup guide 24 is selectively attached to mixer 10.

Figure 2:
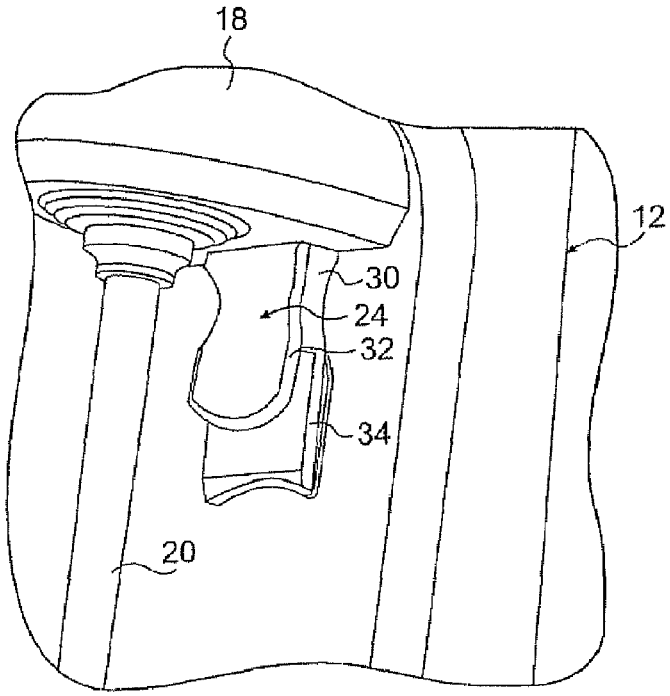
FIG. 2 is a detailed view of one embodiment of the cup guide of the present invention attached to a spindle mixer.
Figure 3:
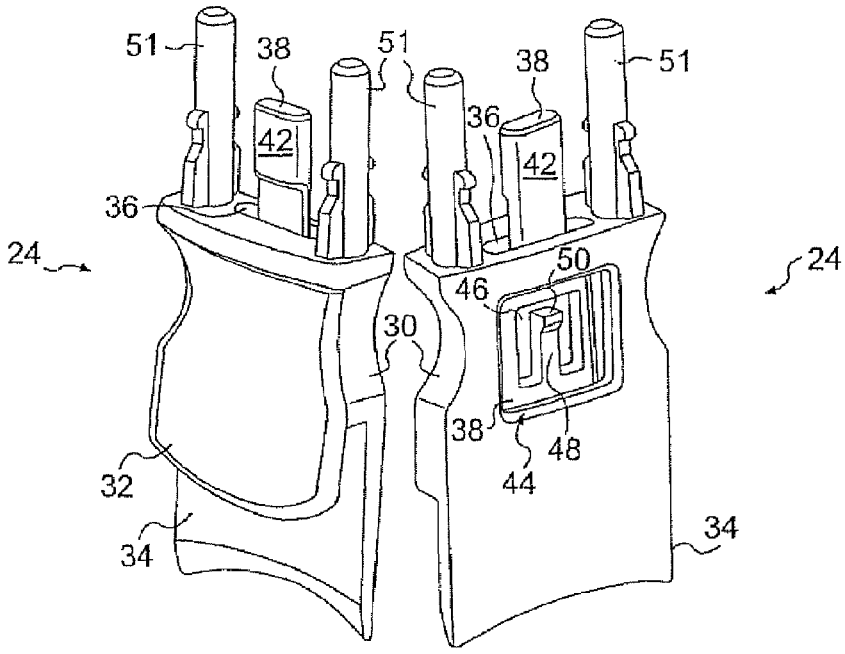
FIG. 3 is a magnified view of one embodiment of the cup guide of the present invention from two different angles.

Considering now FIGS. 2 and 3, cup guide 24 is illustrated in further detail. Cup guide 24, which could be formed of any suitable material, includes a body 30 that has a front side facing away from stand 16, a backside facing stand 16, a top surface facing motor housing 18, a bottom surface facing base 14, and corresponding left and right sides. A front or first lip 32 and back or second lip 34 extend downwardly from body 30. First and second lips 32, 34 are substantially parallel to and spaced apart from one another so that first and second lips 32, 34 are operable to accept the rim of a cup between the two lips. The rim of the cup is beneath the body of the cup guide. The specific shape and dimensions of lips 32, 34 are not critical. However, as illustrated in the embodiment of FIGS. 2 and 3, the second or back lip 34 extends further from body 30 of guide 24 than does the first or front lip 32. This would permit the operator to tilt the top of cup 22 towards guide 24. When rim 26 contacts second lip 34, the operator moves cup 22 upwardly to secure rim 26 between the first and second lips 32, 34. In one preferred embodiment, the space between the first and second lips is equal to or less than 9 millimeters. The bottom of the cup would be placed on a lower cup rest (not illustrated).

The body of the cup guide further includes an aperture 36 that extends from the top to bottom surfaces of body 30. An elongated, substantially rectilinear actuator pin 38 passes through body 30 via aperture 36. The shape and material of the pin are non-critical. It is envisioned that pin 38 will be molded plastic in at least one preferred embodiment.

As illustrated in FIG. 3, the pin has an upper portion 42 that extends beyond the top surface of body 30. In this preferred, but optional, embodiment, upper portion 42 is thicker than the width of aperture 36. Therefore, pin 38 cannot fully pass through aperture 36. In addition, the backside of guide 24 includes an opening or window 44 that allows access to pin 38. Window 44 also permits improved cleaning of the cup guide.

Pin 38 is formed with an aperture 46 arranged transversely to the longitudinal axis of the pin. An arm 48 is included on pin 38 that extends upwardly into the space created by pin aperture 46. Arm 48 can be located on the axis of pin 38 or can be slightly biased outwardly from the axis of pin 38 and towards the backside of guide 24. Either ways the upper portion of arm 48 may include a tab 50 that also projects towards the backside of guide 24. In operation, arm 48 and tab 50 operate as a catch to prevent the automatic removal of pin 38 from body 30 in the vertical direction. Specifically, upward movement of pin 38 causes the tab 50 to encounter the upper edge of window 44. Downward movement of pin 38 could also be limited by arm 48 or tab 50 engaging the bottom edge of window 44. An operator can displace arm 40 towards the longitudinal axis of pin 38 in order to remove the pin in either direction (assuming the width of the pin allows it to fully pass through the guide aperture, as briefly discussed above).

The construction of pin 38 serves several purposes. The dimensions of the upper portion of the pin in one preferred embodiment prevent the pin form passing through aperture 36. The pin can be selectively removed from the guide by displacing arm 48 towards the pin. Yet, there is a range of motion in which pin 38 can move relative to body 24 through aperture 36.

Another envisioned embodiment of guide 24 includes the ability to selectively attach guide 24 to mixer housing 12. In this embodiment, at least one shaft 51 extends upwardly away from body 30. Each shaft 51 includes detents, indents, notches or the like that would be engaged by a corresponding element in a receiver 60 (see FIG. 5) that is internal to the mixer. The ability to selectively retain a shaft is known for mixers and the like and need not be fully discussed herein as the operation would be understood to one of skill in the art.

With guide 24 removed, a plug (not illustrated) could be inserted into the one or more of the openings in the mixer associated with the guide. The plug would act to cover each of the openings associated with the guide so as to prevent or reduce any potential contamination of the mixer housing. Operation of the mixer motor would then be controlled by a bypass switch, as discussed further herein.

Figure 4:
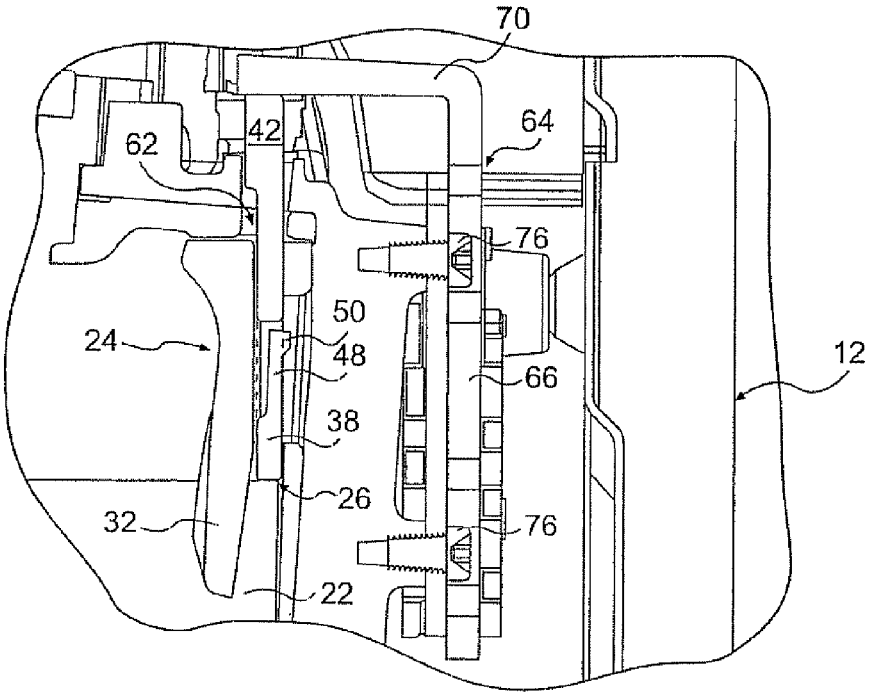
FIG. 4 is a cross-section view of one embodiment of the interlock assembly of the present invention.

Referring now to FIG. 4, the operation of the interlock assembly is illustrated further. Cup guide 24 is in place under the motor housing and against the stand. Cup 22 has been placed on the lower cup rest with rim 26 engaging pin 38. The act of inserting rim 26 of cup 22 into cup guide 24 has displaced actuator pin 38 upwardly into motor housing 18 through a passage 62. The movement of the pin is translated through an interlock mechanism 64 to selectively actuate a micro-switch (not illustrated).

Figure 5:
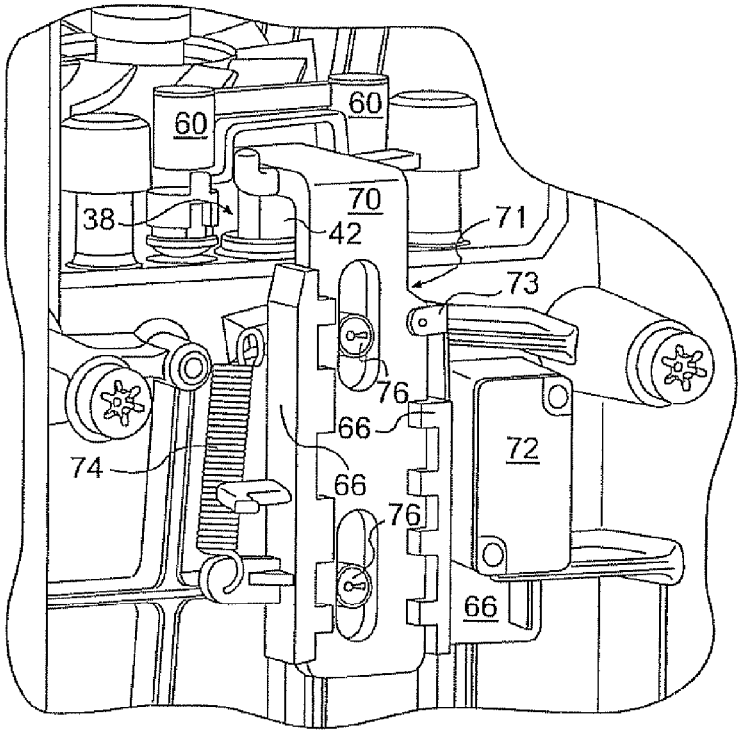
FIG. 5 is a detailed view of one embodiment of an interlock mechanism in accordance with the present invention.

In greater detail, as illustrated in FIG. 5, interlock mechanism 64 includes a bracket 66, an L-shaped slide or coupling 70, the micro-switch 72 with micro-arm 73, and an optional spring 74. Bracket 66 is preferably molded plastic, and, as one of skill in the art would appreciate, could take several forms. As illustrated, bracket 66 includes a planar surface parallel to the front face of stand 16. The bracket's planar surface is secured to the internal side of the stand's front face via fasteners 76 that could be screws, tabs, adhesives, or any other known mechanism for securing the bracket to the inside of the mixer. Bracket 66 supports the micro-switch 72. The bracket also includes two channels that slidably contain slide 70.

In one preferred embodiment, slide 70, which may be formed from molded plastic, die cast chrome-plated metal, or other suitable material, includes two slots through the thickness of the slide. The slots are dimensioned to allow screws 76 to pass through the slide. While the screws hold bracket 66 to mixer housing 12, the heads of the screws also act as stops to limit the slide's range of motion. With or without the screw heads, slide 70 is operable to move along a vertical axis relative to bracket 66.

In use, mixer 10 is attached to an electrical source. Actuator pin 38 is moved vertically into the mixer housing due to the placement of a cup rim within the cup guide. This action causes pin 38 to engage slide 70. As slide 70 moves upwards within the mixer, a cam 71 moves micro-arm 73 to the right (from the perspective illustrated in FIG. 5). The movement of micro-arm 73 closes the circuitry of the micro-switch. The closed circuit sends power to the electric motor. Removing the cup allows pin 38 to at least partially retract from the internal portion of mixer 10. Slide 70 moves downwardly. Micro-arm 73, which is biased to engage slide 70, moves to the left along the slope of cam 71. The micro-arm movement, in turn, opens the micro-switch circuit and turns off the electric motor. Optional spring 74 would provide a biasing force to ensure the slide returns to a lower position in order to actuate the micro-arm and micro-switch. Based upon the foregoing illustrations, it is understood that it would be obvious to one of skill in the art to construct an interlock mechanism with a different configuration that could operate in conjunction with cup guide 24 and actuator pin 38 of the present invention.

Figure 6:
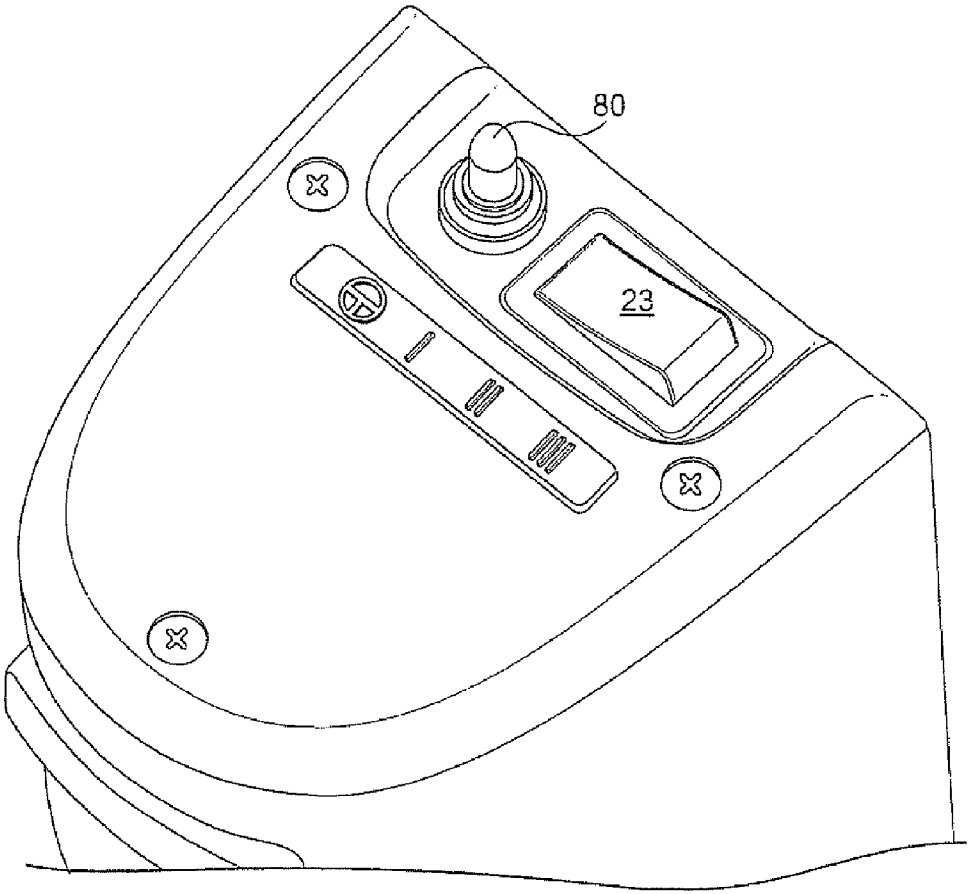
FIG. 6 is a top-down view of a spindle mixer including an optional bypass switch in accordance with one embodiment of the present invention.

With reference to FIG. 6, there is illustrated one preferred embodiment of a bypass or momentary switch 80. Bypass switch 80 permits an operator to hold cup 22 and mix the contents therein without placing rim 26 in guide 24. In other words, the inclusion of bypass switch 80 permits the operation of the electric mixer motor without engaging the actuator pin or interlock mechanism. Therefore, the bypass and micro-switch are preferably wired in parallel to allow the mixer to be engaged by either switch.

Figure 7:
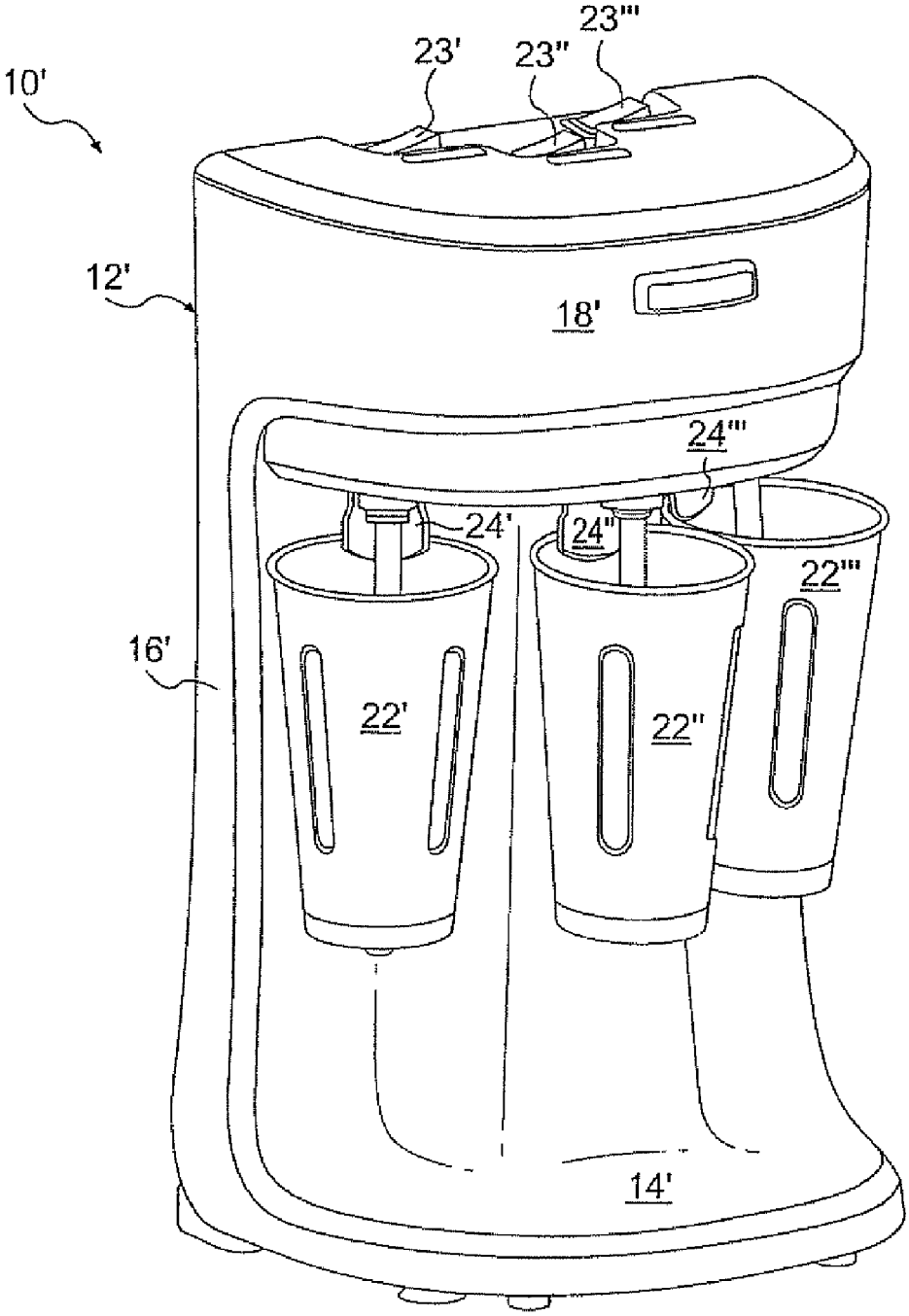
FIG. 7 is a perspective view of a triple-spindle mixer and cups including cup guides in accordance with the present invention.

With reference to FIG. 7, a mixer 10' in accordance with the present invention is illustrated as a multiple spindle mixer. Therefore, a mixer housing 12' would include a base 14', stand 16', and a motor housing 18' operable to mix multiple cups 22', 22'', 22'''. In this embodiment, each spindle is attached to an individual electric motor, and dedicated speed selector switches 23', 23'', 23''' are assigned to each motor. Cup guides 24', 24'', 24''' selectively support each cup. It is also envisioned that bypass switches could be provided to bypass the corresponding interlock mechanisms and switches.

Overall, the unique interlock assembly of the present invention prevents or reduces the possibility of a foodstuff contaminating the internal portion of a mixer housing. Specifically, an actuator pin moves vertically through a cup guide so that there is no exposed opening for foodstuff to enter the mixer. Also, the cup guide of the present invention can be easily removed from the mixer in order to clean the guide. The actuator pin, which comes into contact with the rim of the cup, can also selectively be removed from the cup guide. The interlock mechanism dependably translates the vertical movement of the actuator pin through a micro-switch to turn an electric motor on and off. Accidental engagement of the mixer motor is reduced or eliminated.

While the invention has been described with reference to specific embodiments thereof, it will be understood that numerous variations, modifications and additional embodiments are possible, and all such variations, modifications, and embodiments are to be regarded as being within the spirit and scope of the invention. For instance, the cup guide in another preferred embodiment would be attached to a horizontal surface. The actuator pin would still pass through the body of the cup guide to activate a slide or interlock mechanism within the mixer.

What is claimed is:

1. [A cup guide and actuator pin] *An interlock assembly* for a mixer comprising*:* a cup guide, the cup guide comprising[:]

a body, a first lip extending from the body, a second lip extending from the body, the second lip substantially parallel to and spaced apart from the first lip, the first and second lips operable to accept a rim of a cup wherein the rim of the cup is beneath the body,

*at least one shaft extending from the body, the at least one shaft selectively retained by at least one receiver that is internal to the mixer*; [and]

an actuator pin extending [vertically through] *into* the cup guide [body] *to a space defined between the first lip and the second lip*, the *actuator* pin being selectively moveable within the cup guide [body], the placement of the cup rim between the first and second lips operates to move the actuator pin *vertically* upwards relative to the cup guide [body]*;*

*an interlock mechanism, the actuator pin operable to engage and actuate the interlock mechanism and wherein the actuation of the interlock mechanism activates an electric motor that is internal to the mixer; and*

*a bypass switch operable to activate the electric motor without engaging the interlock mechanism via the actuator pin*.

[2. The cup guide and actuator pin of claim 1, further comprising at least one shaft extending from the body, the at least one shaft selectively retained by at least one receiver that is internal to the mixer.]

[3. The cup guide and actuator pin of claim 1, further comprising an interlock mechanism, the actuator pin operable to engage and actuate the interlock mechanism, and, wherein, the actuation of the interlock mechanism activates an electric motor that is internal to the mixer.]

[4. The cup guide and actuator pin of claim 3, further comprising a bypass switch operable to activate the electric motor without engaging the interlock mechanism via the actuator pin.]

5. The [cup guide and actuator pin] *interlock assembly* of claim 1, wherein the actuator pin is substantially elongated, the actuator pin further comprising an aperture though the longitudinal axis of the actuator pin;

a catch that selectively prevents the removal of the *actuator* pin from the guide; and wherein a window is located on the cup guide.

6. The [cup guide and actuator pin] *interlock assembly* of claim 5, wherein the catch comprises an arm attached to the *actuator* pin, the arm partially bridging the aperture formed in the *actuator* pin, the arm including a tab; and the arm is biased away from the window in order to remove the *actuator* pin from the *cup* guide.

7. The [cup guide and actuator pin] *interlock assembly* of claim 1, wherein the space between the first and second lips is equal to or less than 9 millimeters.

8. An interlock assembly for a spindle mixer comprising:

a cup guide selectively attached to the spindle mixer, the cup guide shaped and dimensioned to accept a rim of a cup, an aperture formed [through a vertical] *along an* axis of the cup guide;

an actuator pin selectively secured within the aperture formed through the cup guide, the actuator pin moveable relative to the cup guide, the rim of the cup operable to displace the actuator pin vertically when the rim is placed in the cup guide; and an interlock mechanism fastened to the inside of the spindle mixer, the interlock mechanism engaged by the actuator pin when the *actuator* pin is displaced by the rim of the cup, wherein the engagement of the interlock mechanism closes an electric circuit connected to an electric motor.

9. The interlock assembly of claim 8, the interlock mechanism further comprising a slide, the slide including a cam;

a micro-switch, the micro-switch providing a micro-arm biased into contact with the slide and the electric circuit connected to the electric motor;

a bracket supporting the slide and micro-switch, the bracket fastened to the inside of the spindle mixer, the bracket slidably supporting the slide; and wherein the slide is engaged by the actuator pin when the *actuator* pin is displaced, the engagement of the slide moving the micro-arm via the cam, and the movement of the micro-arm closing the electric circuit provided by the micro-switch.

*10. A mixer comprising:*

*a cup guide, the cup guide including a body, a front lip extending from the body, a back lip extending from the body, the back lip substantially parallel to and spaced apart from the front lip, the front and back lips operable to accept a rim of a cup therebetween wherein the rim of the cup is beneath the body, the back lip extends further from the body than does the front lip;*

*at least one shaft extending away from the cup guide, the at least one shaft engaging a corresponding element internal to the mixer,*

*an actuator pin extending into the cup guide between the front lip and back lip, the actuator pin being selectively moveable in a vertical direction, the placement of the cup rim between the front and back lips operates to move the actuator pin upwards relative to the cup guide;*

*an opening through the back lip;*

*an interlock mechanism, the actuator pin operable to engage and actuate the interlock mechanism, the actuation of the interlock mechanism activates an electric motor that is internal to the mixer; and*

*a bypass switch operable to active the electric motor without engaging the interlock mechanism via the actuator pin.*

*11. An interlock assembly for a spindle mixer comprising:*

*a cup guide selectively attached to the spindle mixer, the cup guide shaped and dimensioned to accept a rim of a cup, the cup guide including an aperture formed therein;*

*an actuator pin selectively placed within the cup guide aperture, the actuator pin moveable relative to the cup guide, the rim of the cup operable to displace the actuator pin vertically when the rim is placed in the cup guide, the actuator pin selectively retained in the cup guide when the cup guide is selectively detached from the spindle mixer;*

*an interlock mechanism fastened to the inside of the spindle mixer, the interlock mechanism engaged by the actuator pin when the actuator pin is displaced by the rim of the cup, wherein the engagement of the interlock mechanism closes an electric circuit connected to an electric motor; and*

*a bypass switch operable to activate the electric motor without engaging the interlock mechanism via the actuator pin.*

*12. An interlock assembly for a mixer comprising:*

*a cup guide, the cup guide including a body, a front lip extending from the body, a back lip extending further from the body than does the front lip, the back lip substantially parallel to and spaced apart from the front lip, the front and back lips operable to accept a rim of a cup therebetween wherein the rim of the cup is beneath the body;*

*an actuator pin extending into the cup guide between the front lip and back lip, the actuator pin being selectively moveable in a vertical direction, the placement of the cup rim between the front and back lips operable to move the actuator pin upwards relative to the cup guide;*

*an opening through the back lip;*

*an interlock mechanism, the actuator pin operable to engage and actuate the interlock mechanism, the actuation of the interlock mechanism activates an electric motor that is internal to the mixer;*

*a bypass switch operable to activate the electric motor without engaging the interlock mechanism via the actuator pin; and*

*at least one shaft integral with and extending away from the cup guide, the at least one shaft engaging a corresponding element internal to the mixer in order to selectively secure the shaft to the mixer.*

*13. The interlock assembly of claim 1 wherein said at least one shaft further includes at least one of a detent, indent and notch selectively engaged by a corresponding element of the at least one receiver.*

*14. The interlock assembly of claim 10 wherein said at least one shaft further includes at least one of a detent, indent and notch selectively engaged by a corresponding element of the at least one receiver.*

*15. The interlock assembly of claim 12 wherein said at least one shaft further includes at least one of a detent, indent and notch selectively engaged by a corresponding element of the at least one receiver.*

*16. The interlock assembly of claim 1 wherein the actuator pin is selectively retained in the cup guide when the cup guide is selectively detached from the spindle mixer.*

*17. The interlock assembly of claim 10 wherein the actuator pin is selectively retained in the cup guide when the cup guide is selectively detached from the spindle mixer.*

*18. The interlock assembly of claim 12 wherein the actuator pin is selectively retained in the cup guide when the cup guide is selectively detached from the spindle mixer.*

* * * * *